United States Patent
Xie et al.

(10) Patent No.: US 8,012,292 B2
(45) Date of Patent: *Sep. 6, 2011

(54) MULTILAYER ADHESIVE FOR THERMAL REVERSIBLE JOINING OF SUBSTRATES

(75) Inventors: Tao Xie, Troy, MI (US); Xingcheng Xiao, Madison Heights, MI (US); Ruomiao Wang, Warren, MI (US); Hamid G. Kia, Bloomfield Hills, MI (US); Jessica A. Schroeder, Sterling Heights, MI (US); Todd E. Durocher, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/867,558

(22) Filed: Oct. 4, 2007

(65) Prior Publication Data

US 2008/0292848 A1 Nov. 27, 2008

Related U.S. Application Data

(60) Provisional application No. 60/939,680, filed on May 23, 2007.

(51) Int. Cl.
*B32B 3/20* (2006.01)
*B32B 1/00* (2006.01)
*B32B 7/12* (2006.01)
*C09J 5/06* (2006.01)

(52) U.S. Cl. ........ 156/247; 156/311; 156/499; 156/230; 156/272.2; 156/344; 428/413; 428/421; 428/426; 428/457; 525/524; 525/407; 528/121

(58) Field of Classification Search ............... 428/174, 428/354, 188, 617, 413, 423.1, 421, 457, 428/426; 156/311, 247, 272.2, 344, 584, 156/160, 163, 297, 499, 230; 525/524, 407; 528/121

See application file for complete search history.

(56) References Cited

U.S. PATENT DOCUMENTS

| | | | |
|---|---|---|---|
| 5,002,818 A * | 3/1991 | Licari et al. | 428/209 |
| 5,672,402 A * | 9/1997 | Kreckel et al. | 428/34.2 |
| 5,755,913 A | 5/1998 | Liaw et al. | |
| 6,156,842 A * | 12/2000 | Hoenig et al. | 525/171 |
| 6,589,892 B1 * | 7/2003 | Smith et al. | 442/414 |
| 6,692,807 B2 * | 2/2004 | Bries et al. | 428/40.1 |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,032,282 B2 * | 4/2006 | Powell et al. | 29/426.4 |
| 7,188,498 B2 | 3/2007 | Browne et al. | |
| 2001/0047579 A1 | 12/2001 | Lee et al. | |
| 2003/0021981 A1 * | 1/2003 | Lu et al. | 428/317.9 |
| 2005/0151385 A1 | 7/2005 | Autumn et al. | |

(Continued)

OTHER PUBLICATIONS

Nelson et al., Shape Recovery of Nanoscale Imprints in a Thermoset "Shape Memory" Polymer, Applied Physics Letters, 2005, 86, 103108.

(Continued)

*Primary Examiner* — Khanh Nguyen
*Assistant Examiner* — Keith T Aziz
(74) *Attorney, Agent, or Firm* — Reising Ethington P.C.

(57) ABSTRACT

One embodiment of the invention includes a multilayer dry adhesive system capable of reversible joining of rigid substrates.

8 Claims, 2 Drawing Sheets

U.S. PATENT DOCUMENTS

| | | | |
|---|---|---|---|
| 2005/0167556 | A1 | 8/2005 | Fontana et al. |
| 2005/0240190 | A1 | 10/2005 | Gall et al. |
| 2005/0274455 | A1 | 12/2005 | Extrand |
| 2006/0036045 | A1 | 2/2006 | Wilson et al. |
| 2006/0156535 | A1 | 7/2006 | Browne et al. |
| 2006/0188706 | A1* | 8/2006 | Kobayashi et al. ........ 428/317.1 |
| 2007/0023137 | A1* | 2/2007 | Merz .......................... 156/275.7 |
| 2007/0073130 | A1 | 3/2007 | Finch et al. |
| 2007/0289786 | A1 | 12/2007 | Cutkosky et al. |
| 2008/0027199 | A1* | 1/2008 | Mazurek et al. ................ 528/10 |

OTHER PUBLICATIONS

Lendlein et al., Shape-Memory Polymers, Angewandte Chem. Int. Ed., 2002, pp. 2034-2057, vol. 41.

Xie et al., Self-Peeling Reversible Dry Adhesive System, Chem. Mater., 2008, pp. 2866-2868, vol. 20.

Liu et al., Chemically Cross-Linked Polycyclooctene: Synthesis, Characterization and Shape Memory Behavior, Macromolecules, 2002. pp. 9868-9874, vol. 35.

Lendlein et al., Biodegradable, Elastic Shape-Memory Polymers for Potential Biomedical Applications, Science, May 31, 2002, pp. 1673-1676, vol. 296.

Lee et al., Structure and Thermomechanical Properties of Polyurethane Block Copolymers with Shape Memory Effect, Macromolecules, 2001, pp. 6431-6437, vol. 34.

Lin et al., Study on Shape-Memory Behavior of Polyether-Based Polyurethanes. I. Influence of the Hard-Segment Content, J. of Applied Polymer Science, 1998, pp. 1563-1574, V.69.

Lin et al., Study on Shape-Memory Behavior of Polyether-Based Polyurethanes. II. Influence of Soft-Segment Molecular Weight, J. of App. Polymer Science, 1998, pp. 1575-1586, 69.

Epon Resin 828 Structural Reference Manual, Shell Chemicals, Houston, TX, 1999, from www2.shellchemical.com.

Gall et al., Shape Memory Polymer Nanocomposites, Acta Materialia, 2002, pp. 5115-5126, vol. 50.

Gall et al., Internal Stress Storage in Shape Memory Polymer Nanocomposites, Applied Physics Letter, Jul. 12, 2004, pp. 290-292, vol. 85, No. 2.

Xu et al., Synthesis and Shape Memory Effects of Si—O—Si Cross-Linked Hybrid Polyurethanes, Polymer, 2006, pp. 457-465, vol. 47.

Crystallisation of Liquid DGEBPA and DGEBPF Epoxy Resins, Resolution Performance Products, Product Bulletin, SC:2365-01, Jul. 2001.

Jeffamine D-230 Polyetheramine, Technical Bulletin, Huntsman Corporation, Copyright 2006.

Xie et al., Self-Peeling Reversible Dry Adhesive System, Materials, & Processes Laboratory, General Motors Research & Development Center, Chem. Mater. 2008,vol. 20, pp. 2866-2.

Aubert et al., Thermally Removable Epoxy Adhesives Incorporating Thermally Reversible Diels-Alder Adducts, The Journal of Adhesion, 2003, vol. 79, pp. 609-616.

International Search Report and Written Opinion, International Application No. PCT/US/2008/060796 Filed Apr. 18, 2008, Appicant GM Global Technology Operations, Inc.

Unver et al., Geckbot: A Gecko Inspired Climbing Robot Using Elastomer Adhesives, 2006.

Daltorio et al., A Small Wall-Walking Robot with Compliant, Adhesive, Feet, IEEE/RSJ International Conference on Intelligent Robots and Systems, 2005, pp. 4018-4023.

International Search Report and Written Opinon, International Application No. PCT/US2008/060826 filed Apr. 18, 2008, Applicant GM Global Technology Operations, Inc.

Lee et al., A Reversible Wet/Dry Adhesive Inspired by Mussels and Geckos, Nature, Jul. 19, 2007, pp. 338-342, vol. 448.

Lee et al., Single-Molecule Mechanics of Mussel Adhesion, PNAS, Aug. 29, 2005, pp. 12999-13-3, vol. 103, No. 35.

Veriflex Shape Memory Polymer, http://www.crgrp.net/veriflex.shtml, Cornerstone Research Group, Inc., 2003-2007.

Shape Memory Polymer, http://crgnp.net/success-stories.shtml, Cornerstone Research Group, Inc., 2003-2007.

TEMBO Shape Memory Polymers and Elastic Memory Composite (EMC) Material, http://www.ctd-materials.com/products/emc.htm, Cornerstone Research Group, Inc., 2003-2007.

Behl et al., Shape-Memory Polymers: Dual Shape Materials for Bio-medical Applications, A. Mater. Today, 2007, vol. 10, pp. 1- 20.

Bellin et al., Polymeric Triple-Shape Materials, PNAS, Nov. 28, 2006, vol. 103, No. 48, pp. 18043-18047.

Chung et al., Two-Way Reversible Shape Memory in a Semicrystalline Network, Macromolecules, 2008, vol. 41, pp. 184-192.

Rousseau et al., Shape Memory Effect Exhibited by Smectic-C Liquid Crystalline Elastomers, J. Am. Chem. Soc., 2003, vol. 125, pp. 15300-15301.

Liu et al., Review of Progress in Shape-Memory Polymers, Journal of Materials Chemistry, 2007, vol. 17, pp. 1543-1558.

Dietsch et al., A Review—Features and Benefits of Shape Memory Polymers (SMPs), Journal of Advanced Materials, Apr. 2007, vol. 39, No. 2, pp. 3-12.

Li et al., Shape Memory Effect of Ethylene-Vinyl Acetate Copolymers, Journal of Applied Polymer Science, 1999, vol. 71, pp. 1063-1070.

Liu et al., Novel Shape-Memory Polymer with Two Transition Temperatures, Macromol. Rapid Commun., 2005, vol. 26, pp. 649-652.

Reyntjens et al., Polymer Networks Containign Crystallizable Poly(octadecyl vinyl ether) Segments for Shape-Memory Materials, Macromol. Rapid Commun., 1999, vol. 20,pp. 251-255.

Jiang et al., Polymers Move in Response to Light, Advanced Materials., 2006, vol. 18, pp. 1471-1475.

Huang et al., Water-Driven Programmable Polyurethane Shape Memory Polymer: Demonstration and Mechanism, Applied Physical Letters, 2005, vol, 86, pp. 114105-1-114105-3.

Lendlein et al., Light-Induced Shape-Memory Polymers, Nature, Apr. 14, 2005, vol. 434, pp. 879-882.

Goethals et al., Poly(vinyl ethers) as Building Blocks for New Materials, Macromol. Symp. 1998, vol. 132, pp. 57-64.

Xiao, U.S. Appl. No. 12/273,083, Self-Healing and Scratch Resistant Shape Memory Polymer System, filed Nov. 18, 2008.

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, USSN Oct. 4, 2007, Shape Memory Epoxy Polymers, filed Oct. 4, 2007.

* cited by examiner

MULTILAYER ADHESIVE FOR THERMAL REVERSIBLE JOINING OF SUBSTRATES

This application claims the benefit of U.S. Provisional Application No. 60/939,680, filed May 23, 2007.

TECHNICAL FIELD

The field to which the disclosure generally relates includes multilayer adhesives, products including the same, and methods of making and using multilayer adhesives.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 N/cm$^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 N/cm$^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off strength of 3 and 10 N/cm$^2$ towards glass. Both adhesives suffer from severe adhesion loss after only one or two attaching/detaching cycles, as a result of breakdown or lateral collapse of the nano structures, with the latter referring to the bonding of adjacent nano-hairs. In addition, typical synthetic Gecko adhesives only mimic the function of the gecko footpad and function more like adhesive tapes. The mechanical detachment of the footpad by gecko toes is a feature not found in typical synthetic gecko adhesives. If a double side tape-like synthetic gecko adhesive is used to bond two rigid substrates, the bonding is not reversible due to the constrain of the rigid backing layers on both sides.

SUMMARY OF EXEMPLARY EMBODIMENTS OF THE INVENTION

One embodiment of the invention includes a thermo-reversible multilayer dry adhesive system capable of reversible joining of rigid substrates.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
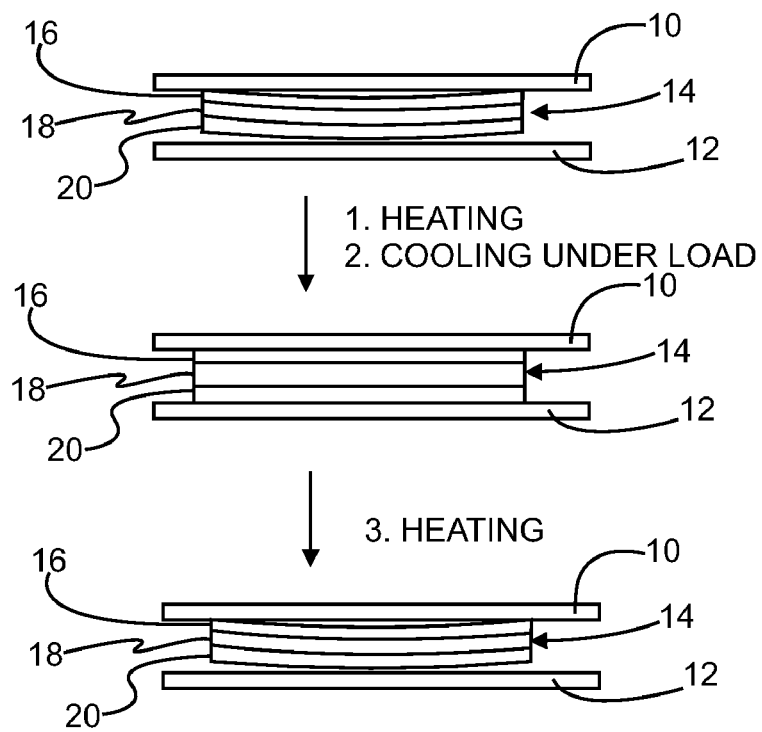
FIG. 1 shows a method of attaching a first substrate to a second substrate utilizing a multilayer adhesive, according to one embodiment of the invention.
Figure 2:
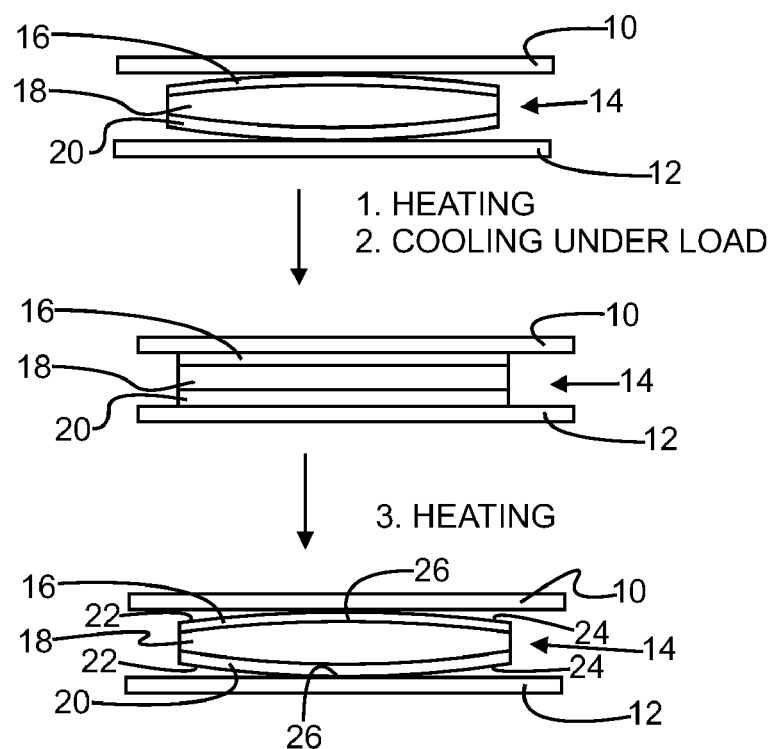
FIG. 2 shows a method of attaching a first substrate to a second substrate utilizing a multilayer adhesive, according to one embodiment of the invention.

Referring now to FIGS. 1-2, one embodiment of the invention includes a product including a thermo-reversible multilayer adhesive 14 having a shape memory polymer (SMP) layer 18, a first dry adhesive layer 16, and a second dry adhesive layer 20. The first dry adhesive layer 16 may overlie the shape memory polymer layer 18, and the second dry adhesive 20 may underlie the shape memory polymer layer 18. In one embodiment of the invention, the first dry adhesive layer 16 and second dry adhesive layer 20 have different profiles. In one embodiment, the first dry adhesive layer 16 may be thinner than the second dry adhesive layer 20. In one embodiment, the multilayer adhesive 14 may be a triple layer adhesive.

As shown in FIG. 1, one embodiment of the invention may include a method of attaching a first substrate 10 to a second substrate 12 utilizing the multilayer adhesive 14. In one embodiment, the first dry adhesive layer 16 has a thickness less than the second dry adhesive layer 20.

In one embodiment, the multilayer adhesive 14 is positioned between the first substrate 10 and the second substrate 12. Then the multilayer adhesive 14 is heated above the glass transition temperature ($T_g$) of the shape memory polymer layer 18 and cooled under a load so that the first substrate 10 is attached to the second substrate 12. Thereafter, the first substrate 10 and second substrate 12 may be detached from each other by heating the multilayer adhesive 14 above the glass transition temperature ($T_g$) of the shape memory polymer layer 18. Because the thicknesses of the dry adhesive layers 16 and 20 may be different, the asymmetrical multilayer adhesive may have a curvature with the curved dry adhesive surface pointing in the same direction as shown in FIG. 1. For example, the outer surface of each of the first dry adhesive layer 16 and the second dry adhesive layer 20 has a generally concave shape. Upon heating and cooling under a load, the multilayer adhesive deforms and a maximum pull-off strength can be achieved. Upon heating the shape memory polymer layer 18 above the $T_g$ thereof, the shape memory polymer layer 18 has a tendency to return to its original curvature, which in principle would create a peeling force to detach the second dry adhesive layer 20 from the second substrate 12. In reality, this peeling of dry adhesive 20 from the substrate 12 would require the spontaneous detachment of the first dry adhesive 16 from the substrate 10, which is not permitted by the peeling detachment mode given the particular geometry in FIG. 1. This means that the detachment of the dry adhesive 16 from substrate 10 will have to work against the strong pull-off strength between the substrate 10 and the first dry adhesive layer 16. Such a separation mechanism is not favorable and only possible when the shape recovery force of the shape memory polymer layer 18 is stronger than the pull-off-strength of the first dry adhesive layer 16.

Referring now to FIG. 2, another embodiment of the invention includes the multilayer adhesive 14 with a geometry wherein the curvature of the first and second adhesive layers 16, 20 point in the opposite directions. For example the outer surface of each of the first dry adhesive layer 16 and the second dry adhesive layer 20 has a generally convex shape. As such, the shape memory polymer layer 18 has a configuration wherein the middle portion thereof is the thickest and narrows or is tapered toward the outer edges of the shape memory polymer layer 18. The multilayer adhesive 14 is placed between the first substrate 10 and the second substrate 12 and heated and then cooled under a load to attach the first substrate 10 to the second substrate 12. The first substrate 10 and the second substrate 12 may be detached from each other by heating the multilayer adhesive 14. Upon heating, this particular geometric design of the multilayer adhesive 14, in principle, would allow the thermo-activated peeling detachment mode on both adhesive sides, which is not possible with the design in FIG. 1. Each of the first and second dry adhesive layers 16 and 20 peel from the substrates 10, 12 respectively, first from near outer edges 22 and 24, and progressing towards a center 26. Although the design in FIG. 2 does permit peeling on both sides for adhesive detachment, the adhesive bonding would require a very large load to deform the multilayer adhesive 14, as the deformation of shape memory polymer layer 18 during bonding is compressive.

In one embodiment, the first substrate 10 and the second substrate 12 may be flat and the multilayer adhesive 14 may be curved. In another embodiment, the first substrate 10 and the second substrate 12 may be curved and the multilayer adhesive 14 may be flat.

Figure 3:
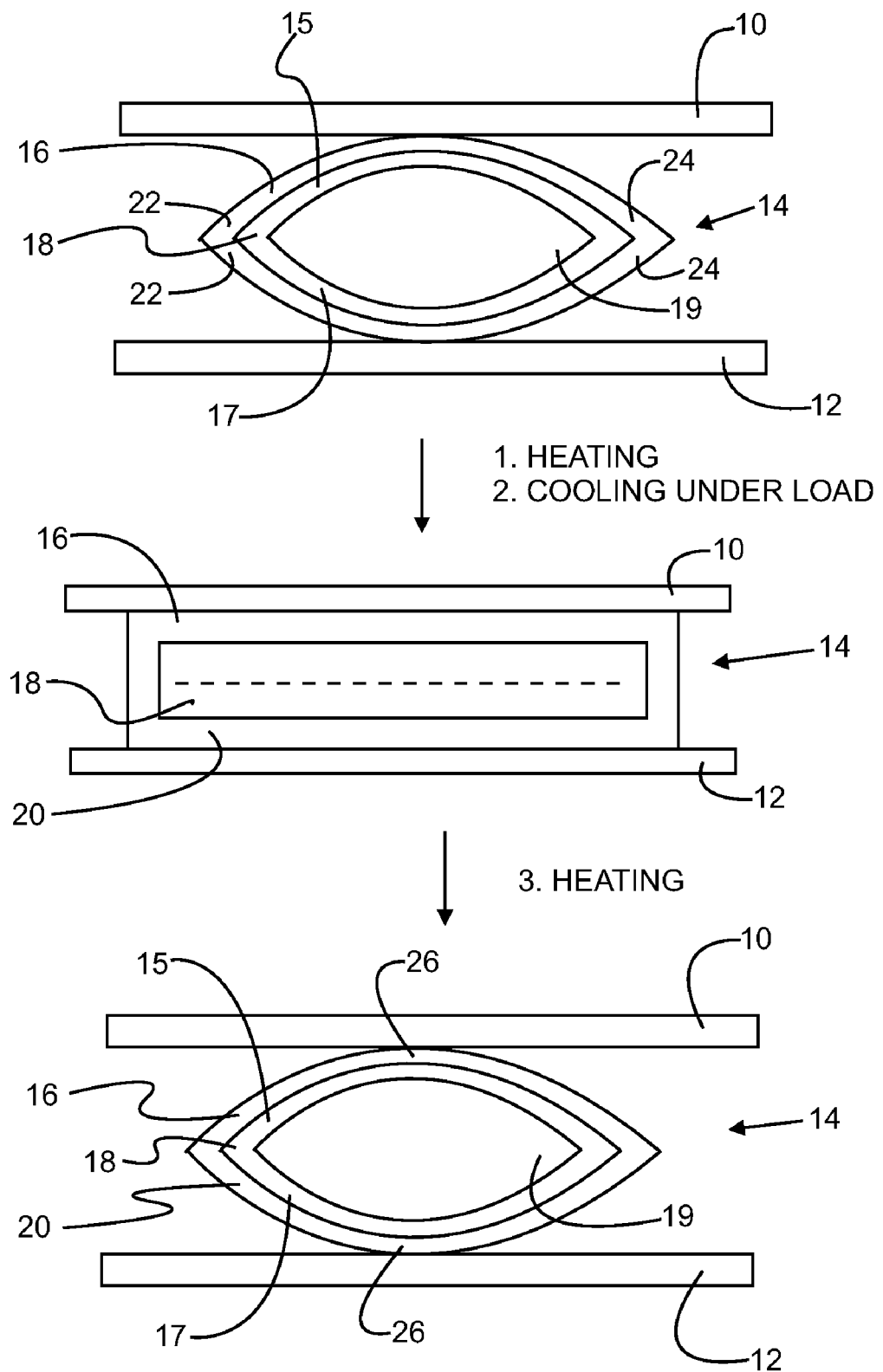
FIG. 3 shows a method of attaching a first substrate to a second substrate utilizing a multilayer adhesive, according to one embodiment of the invention.

Referring now to FIG. 3, another embodiment of the invention includes the multilayer adhesive 14 having the shape memory polymer layer 18, the first dry adhesive layer 16, and the second dry adhesive layer 20. The multilayer adhesive has a geometry wherein the curvature of the first and second adhesive layers 16, 20 point in the opposite directions. For example the outer surface of each of the first dry adhesive layer 16 and the second dry adhesive layer 20 has a generally convex shape. The first and second adhesive layers 16, 20 meet each other at the outer edges 22 and 24. The shape memory polymer layer 18 comprises a first portion 15 adjacent to the first adhesive layer 16 and a second portion 17 adjacent to the second adhesive layer 20, and a cavity 19 is formed between the first portion 15 and the second portion 17. In one embodiment, the shape memory polymer layer 18 has a geometry thickest in the center portion of the shape memory polymer and tapering to the outer edges thereof. The thickness of the cavity 19 may also be the greatest in the center portion and tapering to the outer edges thereof.

In one embodiment, the multilayer adhesive 14 is placed between the first substrate 10 and the second substrate 12 and heated above the $T_g$ of the shape memory polymer 18 and then cooled under a load to attach the first substrate 10 to the second substrate 12. Upon cooling under the load, the cavity 19 may become very small or may disappear altogether. The first substrate 10 and the second substrate 12 may be detached from each other by heating the multilayer adhesive 14 above the $T_g$ of the shape memory polymer 18. Upon heating, each of the first and second dry adhesive layers 16 and 20 peel from the substrates 10, 12 respectively, first from near outer edges 22 and 24, and progressing towards a center 26. Upon heating, the cavity 19 forms in between the first portion 15 and the second portion 17 of the shape memory polymer layer 18. This design shown in FIG. 3 allows the peeling on both sides of the multilayer adhesive 14 and the bonding does not require a very large load as the deformation of the shape memory polymer 18 during bonding is bending in nature.

Another embodiment of the invention includes a method comprising heating the multilayer thermo-reversible dry adhesive 14 including the shape memory polymer layer 18, the first dry adhesive layer 16, and the second dry adhesive layer 20, and wherein the multilayer adhesive 14 has a curved structure at room temperature and applying a load to the adhesive so that the adhesive adheres to an underlying substrate so that the adhered adhesive has a pull-off force greater than 10 N/cm$^2$, and thereafter detaching the adhesive comprising heating the adhesive to a temperature above the $T_g$ of the shape memory polymer 18 to cause the adhesive to return to a curved structure.

The dry adhesive layers 16 and 20 may provide a continuous contact surface or the dry adhesive layers may include a plurality of spaced apart fingers each providing a relative small contact surface so the overall contact surface of the adhesive layer is not continuous.

One embodiment includes a multilayer dry adhesive system capable of reversible joining of rigid substrates having a pull-off adhesion force for joining substantially higher than a peeling-off force for dejoining or unjoining or decoupling.

Numerous shape memory polymers may be utilized in various embodiments of the invention. For example, starting with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with a dry adhesive as desired for a particular application operated within certain temperature ranges. As such, the dry adhesive layer may have a $T_g$ ranging from −90° C. to 200° C., and the shape memory polymer may have a $T_g$ ranging from 25° C. to 200° C.

Some embodiments refer to a multilayer epoxy dry adhesive. It should be understood that more than two layers may be utilized. For example, there may be two or more layers of the shape memory polymer layer, which may be in a side by side relationship or an overlying relationship. Likewise, there may be two or more dry adhesive layers in a side by side relationship or an overlying relationship. As such, a device with custom or tailored properties may be manufactured.

In various embodiments, the dry adhesive layers may be an epoxy elastomeric dry adhesive. In various embodiments, the shape memory polymer may be an epoxy. In various embodiments of the invention, any combination of a shape memory polymer and a dry adhesive may be utilized. The following examples of shape memory polymers and dry adhesives are for illustrative purposes only.

In various embodiments, the components of the dry adhesive or the components of the shape memory polymer may include a rigid epoxy and a flexible epoxy. The range of possible crosslinking chemistries which may be used to achieve a dry adhesive or shape memory polymer may include alpha, omega-diaminoalkanes, organic multi-carboxylic acid, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the dry adhesive may be present in an amount sufficient to provide, upon curing of the composition, a dry adhesive having a glass transition temperature of −90° C. to 200° C. and having a pull-off strength of 1-200 N/cm$^2$ from a substrate. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

One embodiment of the invention includes a method of making a multilayer thermo-reversible dry adhesive comprising heating 3.6 g of EPON 826 (a Bisphenol A based epoxy resin) to about 75° C. and mixing the same with 2.16 g of neopentyl glycol diglycidyl ether (NGDE) and 2.3 g of a diamine such as Jeffamine D-230. Jeffamine D-230 is a polyetheramine that is difunctional, primary amine with an average molecular weight of about 230. The primary amine groups are located on secondary carbons at the end of the aliphatic polyether chain. Jeffamine is available from Huntsman.

The mixture may then be cured in a specially designed mold to create an epoxy shape memory polymer layer having geometry shown in FIG. 3. The curing condition is 100° C. for 1.5 hours. Then a mixture of 2.16 g of NGDE and 1.15 g of an amine such as Jeffamine D-230 is cured on the outer surface of the shape memory polymer layer for 1.5 hours at 100° C. In a third step, the oven temperature may be raised to 130° C. for post-curing for about one hour. At the end of the post-curing, the cured multilayer epoxy is demolded. Overall, the favored curved structure shown in FIG. 3 is created by molding As will become evident hereafter, the curved structure is advantageous in providing a reversibility of the adhesion.

Numerous shaped memory polymers may be utilized in various embodiments of the invention. For example, staring with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with a dry adhesive as desired for a particular application operated within certain temperature ranges.

The following is another embodiment of the invention providing a method of making a shape memory polymer. EPON 826 was weighed into a glass bottle and placed into an oven preset at 70° C. to melt. The melting took about 1 hour. Immediately after the bottle containing the EPON 826 was taken out of the oven, weighed Jeffamine D-230 and NGDE were added to the bottle. The bottle was then shaken vigorously by hand for about ten seconds to mix the components.

The detailed formulations of the five epoxy SMP samples prepared according to the method are summarized in Table 1.

TABLE 1

Formulations of epoxy samples 1-5

| Sample # | EPON 826 (mole) | NGDE (mole) | Jeffamine D-230 (mole) |
|---|---|---|---|
| 1 | 0 | 0.02 | 0.01 |
| 2 | 0.005 | 0.015 | 0.01 |
| 3 | 0.01 | 0.01 | 0.01 |
| 4 | 0.015 | 0.005 | 0.01 |
| 5 | 0.02 | 0 | 0.01 |

Next, the mixture was poured into a mold. The epoxy samples were thermally cured at 100° C. for 1.5 hours and postcured at 130° C. for 1 hour. Upon the completion of the cure, the epoxy samples were demolded. The geometry of the shape memory polymer layer obtained is determined by the mold used.

In another embodiment, the system consists of EPON 826, Jeffamine D-230 as the crosslinker, and decylamine as the monoamine. As shown in Table 2, from sample 6 to 11, the fraction of the crosslinker is systematically reduced, while the total amounts of epoxy functionality and active hydrogen functionality on the amines are maintained equal. Among these samples, sample 11 was used as a reference sample because it contains no crosslinker and is not expected to possess shape memory properties. The shape memory epoxy polymers according to the formulations in Table 2 have $T_g$'s from 25° C. to 90° C.

TABLE 2

Formulations of epoxy samples 6-11

| Sample # | EPON 826 (mole) | Jeffamine D-230 (mole) | decylamine (mole) |
|---|---|---|---|
| 6 | 0.02 | 0.01 | 0 |
| 7 | 0.02 | 0.0075 | 0.005 |
| 8 | 0.02 | 0.005 | 0.01 |
| 9 | 0.02 | 0.0025 | 0.015 |
| 10 | 0.02 | 0.0005 | 0.019 |
| 11 | 0.02 | 0 | 0.02 |

The above description of embodiments of the invention is merely exemplary in nature and, thus, variations thereof are not to be regarded as a departure from the spirit and scope of the invention.

What is claimed is:

1. A method comprising:

placing a multiplayer adhesive system between a first substrate and a second substrate, the multiplayer adhesive system comprising a first dry adhesive layer having a first curved profile, a second dry adhesive layer having a second curved profile, and shape memory polymer layer therebetween;

heating the multiplayer adhesive system;

pressing the substrates together with the heated multiplayer adhesive system therebetween and cooling the multiplayer adhesive system under load to attach the first substrate to the second substrate; and thereafter heating the multiplayer adhesive system so that the multiplayer adhesive system changes shape and peels away from the substrates from the outer edges of the multiplayer dry adhesive system.

2. A method as set forth in claim 1 wherein each of the first dry adhesive layer and the second dry adhesive layer has a generally convex curved profile.

3. A method as set forth in claim 1 wherein the shape memory polymer layer comprises:
   at least one of a rigid epoxy or a flexible epoxy; and
   at least one of a crosslinking agent or a catalytic curing agent;
   wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

4. A method as set forth in claim 1 wherein the first adhesive layer and the second adhesive layer comprises:
   at least one of a rigid epoxy or a flexible epoxy; and
   at least one of a crosslinking agent or a catalytic curing agent;
   wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

5. A method comprising:
   placing a multilayer adhesive system between a first substrate and a second substrate, the multilayer adhesive system comprising a first dry adhesive layer, a second dry adhesive layer, and shape memory polymer layer therebetween, wherein the shape memory polymer layer comprises a first portion adjacent to the first dry adhesive layer and a second portion adjacent to the second dry adhesive layer and a cavity therebetween, wherein an outer surface of each of the first dry adhesive layer and the second dry adhesive layer has a convex shape, and wherein the thickness of the cavity is the greatest in a center portion of the multilayer adhesive system and tapers to outer edges thereof;
   heating the multilayer adhesive system;
   pressing the substrates together with the heated multilayer adhesive system therebetween and cooling the multilayer adhesive system under load to attach the first substrate to the second substrate; and
   thereafter heating the multilayer adhesive system so that the multilayer adhesive system changes shape and peels away from the substrates from the outer edges of the multilayer dry adhesive system.

6. A method comprising:
   placing a multilayer adhesive system between a first substrate and a second substrate, the multilayer adhesive system comprising a first dry adhesive layer, a second dry adhesive layer, and shape memory polymer layer therebetween, wherein the shape memory polymer layer has a geometry thickest in a center portion of the shape memory polymer layer and tapering to the outer edges thereof;
   heating the multilayer adhesive system;
   pressing the substrates together with the heated multilayer adhesive system therebetween and cooling the multilayer adhesive system under load to attach the first substrate to the second substrate; and
   thereafter heating the multilayer adhesive system so that the multilayer adhesive system changes shape and peels away from the substrates from the outer edges of the multilayer dry adhesive system.

7. A method as set forth in claim 1, wherein said shape memory polymer has a glass transition temperature and said heating the multiplayer adhesive system comprises heating to a temperature above the glass transition temperature.

8. A method as set forth in claim 1, wherein said multiplayer adhesive system comprises at least two shape memory polymer layers.

\* \* \* \* \*